July 24, 1956 W. R. DRESSER 2,756,317
APPARATUS FOR PUTTING IDENTIFICATION AND SYNCHRONIZATION
MARKS ON PICTURE AND SOUND FILMS
Filed March 23, 1953
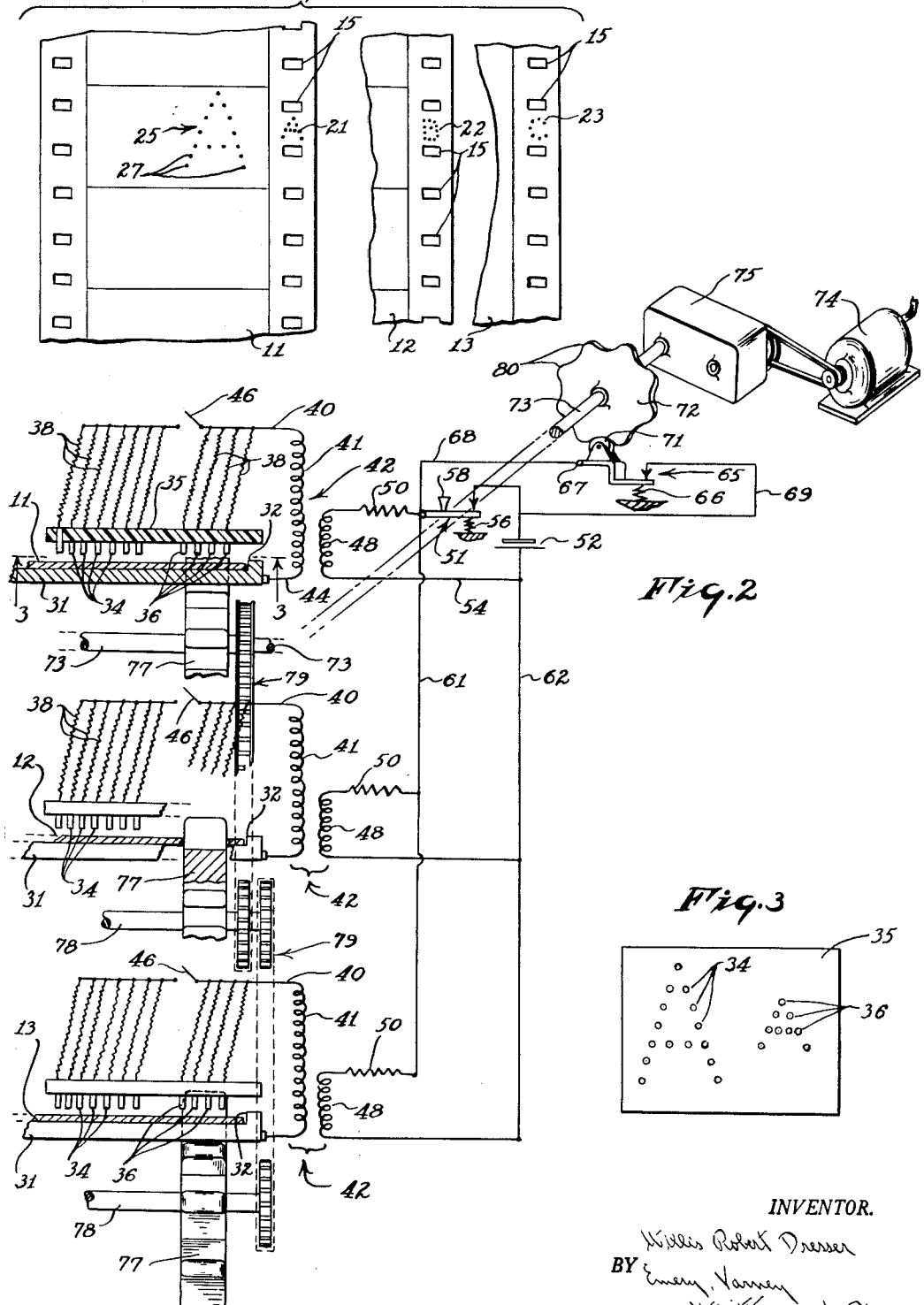
INVENTOR.
Willis Robert Dresser
BY
Emery, Varney,
Whittemore & Dix
ATTORNEYS

United States Patent Office 2,756,317
Patented July 24, 1956

2,756,317

APPARATUS FOR PUTTING IDENTIFICATION AND SYNCHRONIZATION MARKS ON PICTURE AND SOUND FILMS

Willis Robert Dresser, Long Hill, Conn., assignor to The Vitarama Corporation, Huntington, N. Y., a corporation of New York Application March 23, 1953, Serial No. 344,055

3 Claims. (Cl. 219—19)

This invention relates to apparatus for putting identification and synchronization marks on films.

It is an object of this invention to provide improved apparatus for putting such marks on films, and more particularly, to provide apparatus which is equally suitable for marking motion picture film and magnetic sound films or tapes. Another object is to provide improved apparatus for putting synchronization marks on a plurality of films simultaneously, such as the films used for producing mosaic images.

The invention marks the films by producing rows of marks on the film by means of electric sparks, and one feature of the invention relates to the synchronizing of the film-marking apparatus with the film speed for locating marks between successive sprocket tooth openings in the films.

The same apparatus marks the photographic films and the magnetic films which are used with the photographic films for sound or control signals or both.

Other objects, features and advantages of the invention will appear or be pointed out as the description proceeds.

In the drawing, forming a part hereof, in which like reference characters indicate corresponding parts in all the views:

Figure 1 is a fragmentary view showing a plurality of films with identification and synchronization marks applied to them in accordance with this invention;

Figure 2 is a diagrammatic view showing apparatus for applying the marks illustrated in Figure 1; and Figure 3 is a detail view taken on the line 3—3 of Figure 2.

Figure 1 shows three film strips, 11, 12 and 13. Each of the film strips has rows of sprocket openings 15 along both longitudinal edges of the strip. The film strips 11 and 12 are moving picture films, and the film strip 13 is a magnetic film strip which is ordinarily used for sound tracks but which may also be used for control signals such as are employed to change the gain of amplifiers and to shift from one speaker to another where the motion picture is accompanied by stereosonic effects.

The film strips 11 and 12 are intended for simultaneous exhibition, preferably for projecting different sections of a mosaic picture; but they may also be films having the complementary pictures for stereoscopic motion pictures.

In the operation of such films, it is important to synchronize not only the picture films but also the magnetic film with its sound and control signals. Marks are applied to the films to indicate synchronization points on the films and also to identify the films. For example, a synchronization mark 21 on the film strip 11 corresponds with locations indicated by synchronization marks 22 and 23 on the film strips 12 and 13, respectively. In order to identify these different film strips, the synchronization marks 21, 22 and 23 are of different outline, and in the illustrated embodiment of the invention these synchronization and identifying marks are letters, but other legends can be used, such as numbers, or different geometrical designs can be employed.

For accurate synchronization, the marks 21, 22 and 23 are located at particular sprocket openings, and preferably in the area of the films between successive sprocket openings. When the synchronization marks are at a portion of the film strips where marks on the face of the film are not objectionable, as in the case of the beginning or end of a film strip, other identifying marks, such as the legend 25, may be employed. This mark or legend 25 is substantially larger than the synchronization mark 21 so that it can be seen more quickly, and it otherwise corresponds to the mark 21. Similar large identification marking may be applied to the face of the film strips 12 and 13.

In the illustrated embodiment of the invention, the marks 21, 22, 23 and 25 consist of holes or craters 27 in the film produced by the discharge of sparks through or into the film. These holes or craters are very small but their visibility is increased on some types of films by a blackening of the film surface immediately adjacent to the holes.

Figure 2 shows the apparatus for producing the marks shown in Figure 1. The film strip 11 travels across a plate 31 having a shoulder 32 which serves as a guide for the film strip. The top surface of the plate 31, on which the film strip rests, serves as ground electrode means for a plurality of electrodes 34 located adjacent to and immediately above the film strip 11. The electrodes 34 are carried by an electrode support 35 and they are in a group and disposed in rows that form the outline of the legend 25 as shown in Figure 3. There is another group of electrodes 36 carried by the electrode support 35 and these other electrodes 36 are disposed in rows to make the mark 21.

The electrodes 34 and 36 are supplied with power through branch conductors 38 which connect with a main conductor 40 leading from a secondary winding 41 of a spark coil 42. The other side of the secondary winding 41 is connected to the plate 31 by a conductor 44. Since the electrodes 34 are used only at portions of the film strip where marks are to be placed on the face of the film, a switch 46 is provided for disconnecting these electrodes 34 from the spark coil 42 at other times.

The film strips 12 and 13 are supported by plates 31 similar to the plate 31 under the film strip 11; and similar groups of electrodes are used for marking the film strips 12 and 13. The corresponding parts at the different marking stations for the respective film strips 11, 12 and 13 are indicated by the same reference characters in Figure 2.

The upper spark coil 42 has a primary winding 48 which is connected on one side through a resistance 50 and switch 51 to a source of power, here shown as a battery 52. The other side of the primary winding 48 is connected with the battery 52 through a conductor 54. The switch 51 is biased toward closed position by a spring 56 and there is a push-button 58 for opening the switch 51 against the tension of the spring 56. There are conductors 61 and 62 connecting the primary windings of the other spark coils 42 with the battery 52. The switch 51 controls the supply of power to all of the spark coils 42 so that when an operator actuates the switch 51 to open the circuit, all of the spark coils 42 supply power simultaneously to their associated electrodes.

The supply of electric current to the spark coils 42 and the inductance and winding ratios of these spark coils are correlated to produce an output potential sufficiently high to discharge sparks from the electrodes 34 and 46 to the film strips below the electrodes. This discharge of current marks the film strips and if sufficiently strong produces holes in the film strips, and with certain kinds of film strips, produces craters in the emulsion. With a magnetic film strip, and some photographic film strips, the electric discharge darkens the material on the surface of the strip immediately adjacent to the edges of the holes or craters produced by the sparks.

In applying the markings, which are located between successive sprocket openings, it is important to prevent the electrodes from sparking when some or all of the electrodes are located over a sprocket opening. In order to synchronize the electrode discharges with the presence of film strip material under the electrodes, a synchronizing switch 65 is provided. This synchronizing switch 65 is biased toward closed position by a spring 66 and the switch moves between open and closed positions about a pivot 67. The switch 65 is connected in parallel with the switch 51 by conductors 68 and 69 and thus provides a shunt circuit from the battery 52 to the spark coils 42. Opening of the switch 51, therefore, while the switch 65 is closed, has no effect upon the spark coils 42.

A cam follower 71 is connected to the switch 65. This cam follower 71 is operated by a cam 72 driven by a shaft 73 from a motor 74 through reduction gearing 75. The motor 74 also drives feed sprockets 77 connected to an extension of the shaft 73. The feed sprocket 77 for one side of the film 11 is shown in Figure 2, but it will be understood that there is a similar feed sprocket 77 on the other side of the film strip.

There are similar feed sprockets 77 for the film strips 12 and 13. All of the film sprockets 77 have teeth which engage the sprocket openings in the film strips as they travel across the plates 31 at the marking station. The sprockets 77, for the film strips 12 and 13, are on shafts 78.

The shaft 78, that drives the sprocket 77 which advances the film strip 12 is driven from the shaft 73 through a chain-and-sprocket connection 79. In like manner, the shaft 78, which drives the sprocket 77 for the film strip 13, is driven from the upper shaft 78 by another chain-and-sprocket connection 79. The motor 74, reduction gearing 75, shaft 73, together with the sprockets 77, shafts 78 and chain-and-sprocket connections 79 provide film-strip feed mechanism which, through the cam 72 controls the operation of the film marking electrodes.

There are rises 80 at angularly spaced locations around the cam 72 and each of these rises 80 corresponds with the space between successive sprocket teeth of the sprockets 77. The rises 80 are located at such a phase angle relation to the teeth on the sprockets 77 that one of the rises 80 displaces the cam follower 71 and opens the switch 65 each time that one of the film strip areas, between successive sprocket openings, is in position opposite the group of electrodes 36 in the electrode support 35. The film strips 12 and 13 are driven by feed mechanism which is synchronized with the sprockets 77. Synchronized driving mechanism for film strips is well understood in the art and no further description of it is necessary for a complete understanding of this invention.

The preferred embodiment of the invention has been illustrated and described, but changes and modifications can be made, and some features of the invention can be used in different combinations without departing from the invention as defined in the claims.

I claim as my invention.

1. Apparatus for making identification and synchronization marks between successive sprocket openings of a film strip that has a row of spaced apart sprocket openings near at least one of the longitudinal edges of the film, said apparatus including a guide along which the film strip moves, the guide having means for restraining transverse movement of the film strip, a group of electrodes disposed in rows that form the outline of an identifying legend the electrodes being adjacent to the guide and located over the row of sprocket openings and over a limited area of less longitudinal extent than the spacing of the sprocket openings, ground electrode means confronting said electrodes for location on the opposite side of the film from said group of electrodes, the strip being movable longitudinally through the guide, means to supply electric current at a potential high enough to discharge sparks from the electrodes to the film strip, an operator-actuated controller for the electric power, and control means including sprockets that engage said openings for synchronizing the spark discharge with respect to the film movements including a device to prevent the controller from operating when sprocket openings are located in front of said electrodes.

2. Apparatus for applying identification and synchronization marks to a plurality of film strips between successive sprocket openings including separate marking stations for the respective film strips, a group of electrodes at each of the marking stations, the electrodes of each group being disposed in rows that form the outline of an identifying legend, ground electrode means confronting each group of electrodes for location on the opposite side of the film strip from the group of electrodes, means that supply electric current at high potential to discharge sparks from the electrodes to the film strips, an operator-actuated controller that inaugurates the supply of current to the electrodes at all of the marking stations simultaneously, film strip feed mechanism that advances the different film strips in timed relation past the groups of electrodes, and means controlled by said mechanism to prevent discharge of sparks from the electrodes when sprocket openings at any of the stations are opposite the electrodes at that station.

3. The apparatus described in claim 2 characterized by a spark coil for supplying the high potential current to the electrodes, a first switch that breaks the spark coil circuit and that serves as the operator-actuated controller, and in which the means for preventing sparking is a shunt circuit around the switch with a second switch in the shunt circuit and operating mechanism for the second switch including a cam driven from the film strip feed mechanism and in timed relation with the film strip feed mechanism and in timed relation with the film strip feed mechanism to open said shunt circuit only when a film section between sprocket openings is adjacent to the electrodes whereby opening of the spark coil circuit and the resulting supply of high potential current to the electrodes is obtained by simultaneous opening of both switches.

References Cited in the file of this patent

UNITED STATES PATENTS

| 1,097,895 | Thomson | May 26, 1914 |
| 1,465,241 | Townsend | Aug. 14, 1923 |
| 1,493,014 | Boyle | May 6, 1924 |
| 1,795,564 | Korge | Mar. 10, 1931 |
| 2,528,157 | Menke | Oct. 31, 1950 |

FOREIGN PATENTS

| 581,221 | Great Britain | Oct. 4, 1946 |